Aug. 12, 1958  C. PACIELLO  2,846,771
APPARATUS FOR MEASURING THE THICKNESS OF LENSES
Filed March 15, 1957

INVENTOR.
Celso Paciello
BY
ATTORNEY

United States Patent Office 2,846,771
Patented Aug. 12, 1958

2,846,771
APPARATUS FOR MEASURING THE THICKNESS OF LENSES

Celso Paciello, New York, N. Y.

Application March 15, 1957, Serial No. 646,295

Claims priority, application Brazil January 17, 1957

4 Claims. (Cl. 33—172)

The present invention is intended to solve one of the technical problems in the preparation of lenses for optical purpose, and aims to provide a means for ascertaining the thickness of such a lens during the operation of thinning out the lens blank by grinding when one prepared face of the lens is mounted (as by sealing wax or other adhesive) on a metal base which holds the lens firmly for working purposes.

In this operation of preparing a lens, the grinding action to which it is subjected removes glass over its entire surface, often resulting in excessive thinning and even eventual breakage, with loss of the lens, which is caused by the impossibility of ascertaining its exact thickness during the thinning operation.

At the present time, the process of thinning a lens is is made by vision calculation only, which demands much practice and good eyesight from the operator, since the only measuring apparatus known up to now consists in simple parts, which, when set up, looks like a pair of pliers; to operate it is necessary that this apparatus should "pinch" the lens, on both sides at the same time, which causes it to become inoperative, even impossible of being used when the lens is covered on one side, as described above. As the lens cannot be freed before the preparation of its surface has been completed, it becomes impossible to measure it, and it follows, therefore, that the desired thickness cannot normally be attained, since the thinning process is entirely and exclusively dependent upon the ability of the expert in relation to his visual practice, which is always precarious and subject to faults.

It is necessary, therefore, to apply some instrument which will assure the exact measuring of the lenses under the situation described in order to avoid technical errors, which are common and must be eliminated.

The solution of the problem is, therefore, in the adoption of a better and more adequate apparatus, such as that described below.

According to my invention I provide a tool comprising a body and a pair of legs, at least one of which is hinged, means at the base of the legs to hold a template or lens to be ground, a measuring arm of adjustable length pivotally mounted on the body in such fashion that it can move vertically about the pivot, and means to measure the up and down movement of the top of the arm.

The invention can be best understood by referring to the accompanying drawings, in which Fig. 1 is a front view of my tool;

Figure 1:
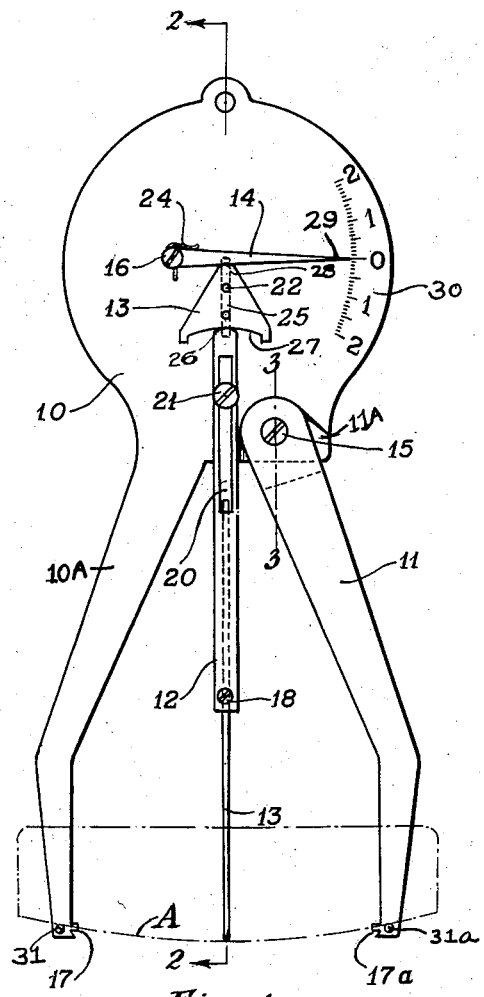
Figure 2:
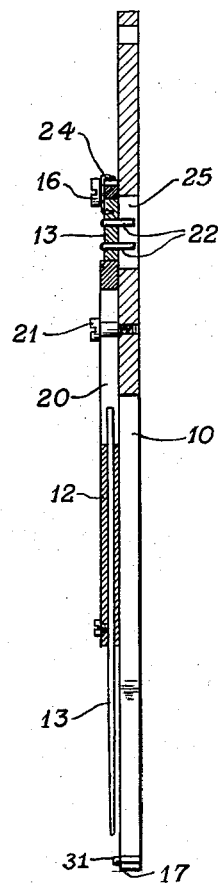
Fig. 2 is a section through the line 2—2 of Fig. 1.
Figure 3:
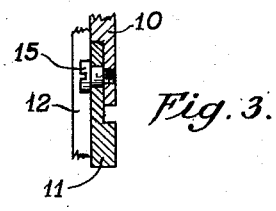
Fig. 3 is a broken section through the line 3—3 of Fig. 1.

Referring to the drawings, my tool comprises a roughly circular body 10 with an integral leg 10A leading downward therefrom, and a second leg 11 pivotally connected to the body 10 by a pivot screw 15, in a recess 11A in the bottom of the body opposite to the leg 10A. On the inside of the legs 10A—11 I provide detents 17—17A, on which the mounting of the lens to be ground can be held, and studs 31—31A on which a template A can be held at the same level as the mounted lens face.

I provide a measuring arm, comprising a main stem 12 with a central bore in which a needle 13 can be moved up and down, and set at any length by means of a set screw 18. The main stem is pivotally connected to the body 10 by a pivot screw 21 through an elongated opening 20 in the upper part of the main stem 12. The top 26 of the stem 12 is preferably rounded.

Mounted for up and down motion on the circular body 10, just above the stem 12, is a translating piece 13, which is mounted by a pair of pins 22 in a vertical groove 25 in the body 10. The piece 13 is roughly triangular in shape, with an arcuate bottom 27, so that the top 26 of the stem 12 can rotate freely.

The apex 28 of the translating piece 13 bears against a pointer 14, one end of which is pivoted to the body 10 by means of a pivot screw 16 and is held in contact with the piece 13 by a spring 24. The pivot is relatively close to the point of contact between the piece 13 and the pointer 14 so that at the end 29 of the pointer, the scale 30 to which it points can considerably magnify the up and down motion of the piece 13.

Operation

In the operation of the device, templates are provided, with curvatures equal to the curvatures of the covered faces of the lenses to be worked on. For any lens, the proper template A is mounted on the studs 31—31A, so that it provides an arc corresponding to the position and curvature of the mounted bottom of the lens to be ground, when mounted on the detents 17—17A. The needle 13 is adjusted by moving it as needed in the bore of the stem 12, so that it sweeps the desired arc, and the set screw 18 is tightened.

The mounted lens is now placed in the tool, with its supports mounted on the detents 17—17A so that its mounted face occupies the same position as the top of the template A did. Now, at each point of the free face of the lens, the end of the needle 13 is elevated by the thickness of the lens at that point. The stem 12 is moved upward in the slot 20 over the pivot screw 21; it in turn pushes up the piece 13 which activates the pointer 14 so that the vertical rise can be measured—much magnified—on the scale 30. A point by point measurement across the lens can be made, so that the desired degree of curvature can be obtained on the lens top, without demounting.

Obviously, the device can be used for other work than lens grinding, and changes can be made in the specific embodiment of my invention shown here, without departing from the scope of my invention as set out in the claims.

I claim:

1. An apparatus for measuring the thickness of an object mounted on a base comprising a body and a pair of legs mounted on the body, at least one of the legs being pivotally mounted on the body so that it can be moved to and from the other leg, means on the legs to hold the object whose thickness is to be measured, a measuring arm pivoted on the body in such fashion that it can move vertically about the pivot, means to adjust the length of the measuring arm below the pivot, and means on the body to measure the upward displacement of the measuring arm from an original set position.

2. An apparatus for measuring the thickness of an object mounted on a base comprising a body and a pair of legs mounted on the body, at least one of the legs being pivotally mounted on the body so that it can be moved to and from the other leg, means on the legs to hold the object whose thickness is to be measured, a measuring arm comprising a stem pivotally mounted on the body through an elongated opening in its upper part, so that it can move vertically about the pivot, and having a needle mounted in a bore in its lower part and capable of being moved in the bore to vary the length of the measuring arm, and of being fixed in place thereafter, and means on the body to measure the upward displacement of the measuring arm from an original set position.

3. The apparatus of claim 1, in which the means to measure the upward displacement comprises a translating piece mounted for vertical movement on the body, and having a curved bottom which engages a curved top formed on the measuring arm, and a pointer pivotally mounted on the body close to the top of the translating piece and extending to a dial on the body a substantially greater distance from the top of the translating piece so that the vertical displacement of the translating piece is substantially magnified.

4. The apparatus of claim 2 in which the means to measure the upward displacement comprises a translating piece mounted for vertical movement on the body, and having a curved bottom which engages a curved top formed on the stem, and a pointer pivotally mounted on the body close to the top of the translating piece and held in contact therewith by spring pressure, and extending to a dial on the body a substantially greater distance from the top of the translating piece so that the vertical displacement of the translating piece is substantially magnified.

No references cited.